No. 12,847. REISSUED AUG. 25, 1908.

G. SCHUBERT.

SELF FEEDING HAY PRESS.

APPLICATION FILED FEB. 5, 1908.

2 SHEETS—SHEET 1.

Witnesses:

J. W. Stitt.

A. W. Dobson.

Inventor,

George Schubert,

By A. L. Jackson,

Attorney.

THE NORRIS PETERS CO., WASHINGTON, D. C.

No. 12,847. REISSUED AUG. 25, 1908.
G. SCHUBERT.
SELF FEEDING HAY PRESS.
APPLICATION FILED FEB. 5, 1908.
2 SHEETS—SHEET 2.
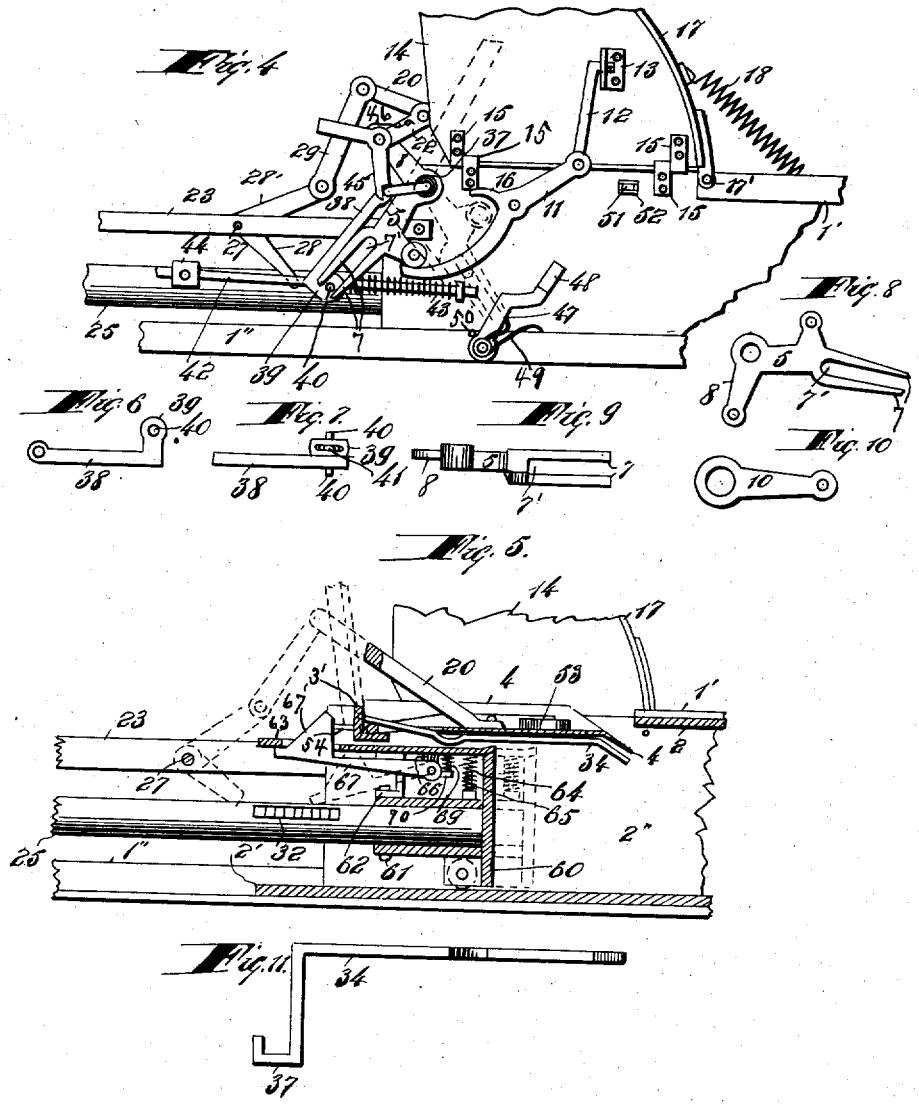
Witnesses:
J. W. Stitt
A. W. Dobson.
Inventor,
George Schubert,
By A. L. Jackson,
Attorney.
THE NORRIS PETERS CO., WASHINGTON, D. C.

UNITED STATES PATENT OFFICE.

GEORGE SCHUBERT, OF FORT WORTH, TEXAS.

SELF-FEEDING HAY-PRESS.

No. 12,847. Specification of Reissued Letters Patent. Reissued Aug. 25, 1908.

Original No. 866,228, dated September 17, 1907, Serial No. 294,186. Application for reissue filed February 5, 1908. Serial No. 414,455.

*To all whom it may concern:*

Be it known that I, GEORGE SCHUBERT, a citizen of the United States, residing at Fort Worth, in the county of Tarrant and State of Texas, have invented certain new and useful Improvements in Self-Feeding Hay-Presses, of which the following is a specification.

This invention relates to an improvement in self-feeding hay presses, of the kind in which a man pitches the hay into the hopper, from said hopper the hay is shifted to the compression chamber by mechanical means. And instead of making use of the usual hopper I use two or more plates or wings, pivoted to the press, (four in the present instance,) and mechanism by which said wings are operated at the specified time. And to use one of said wings as a controlling wing, to close the hopper, and shift the material down to the compression chamber. And, an advance arm or tongue, to close down on the hay, to hold said hay on or in the hopper while the hopper is being closed. And, advance levers pivoted to the press and connected to the side wings of the hopper, and operated by crank-arms on the shaft of the controlling wing in such a manner to close the hopper during the first portion of movement of the controlling wing, and for said controlling wing to shift the material to the compression chamber down to a level of the upper edge of the plunger, and hold same there until partly compressed.

My invention further consists, in the designing and arranging of such mechanism to accomplish these operations, as will be described and pointed out in the claims.

Figure 1:
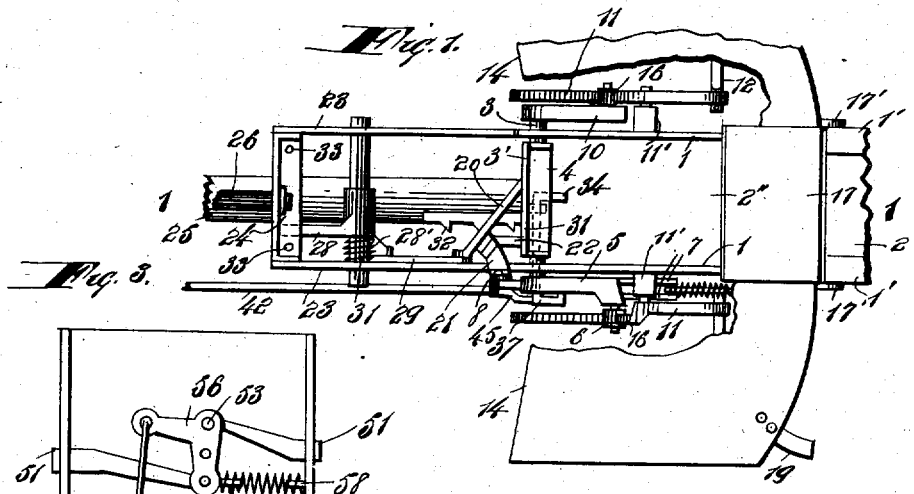
Figure 3:
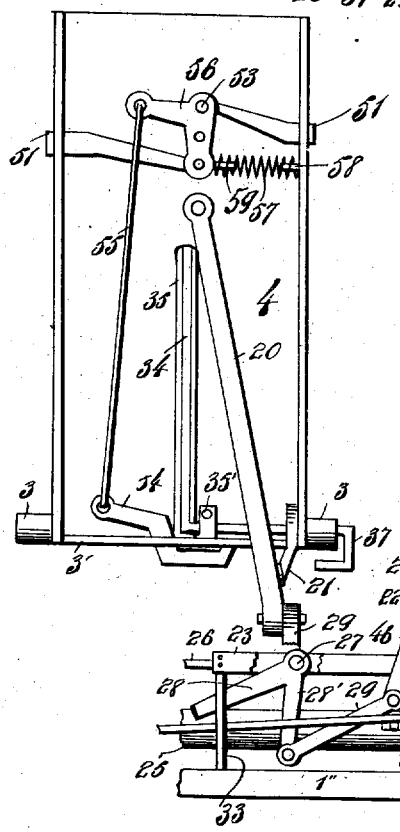
Figure 2:
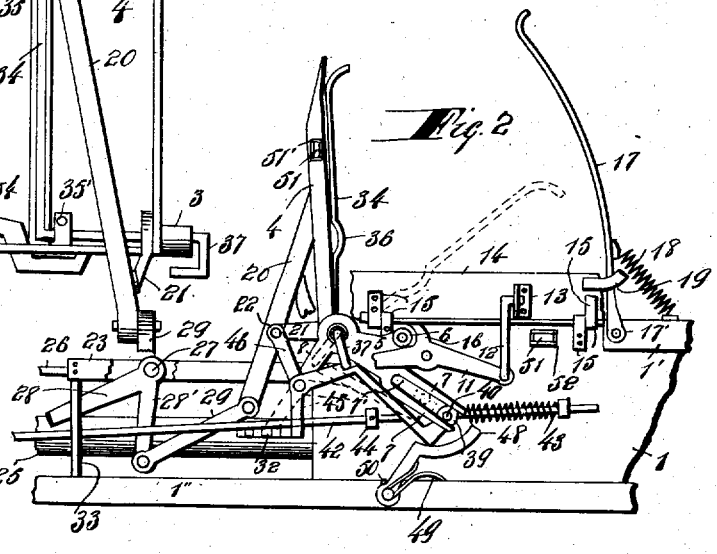

Figure 1 is a top plan view of a portion of a hay press, provided with my improvements, showing the hopper or wings opened out, in position to receive the hay. Fig. 2 is a side view of same, of the near side. The advance movement of the tongue and its operating mechanism being shown in dotted lines. Fig. 3 is a plan view of the controlling wing and its mechanism Fig. 4 is a view similar to Fig. 2, showing the hopper closed, and in dotted lines the partial movement of the controlling wing during the closing of the hopper, and closed down and the tongue locked in position, in full lines. Fig. 5 is a longitudinal vertical section on the line 1—1 of Fig. 1, with the controlling wing and the tongue down, or as seen in Fig. 4. Fig. 6 is a shiftable member to operate the tongue. Fig. 7 is an edge view of same. Fig. 8 is a plan view of the crank arm, carried by the pivot of the controlling wing. Fig. 9 is an edge view of same crank arm. Fig. 10 is a plan view of a crank arm carried on the opposite pivot of the controlling wing. And Fig. 11 is a plan view of the tongue carried by the controlling wing.

Referring to Figs. 1 and 2; 1, 1, represents the usual side plates of the press body retained by the corner bars, 1′ and 1″ as in general use. The top plate 2, (see Fig. 5,) is discontinued at a certain point, to provide the usual feed opening or compression chamber 2″. The bottom plate 2′ is extended a short distance beyond the rear end of the compression chamber 2″. In the front and upper corner of the plates 1, 1, (the power end of the press being considered the front end,) is pivoted a shaft or pivot 3, of the controlling wing 4. Said shaft 3 is preferably formed of an angle bar 3′ with its ends rounded in to form the journals 3, and hollow or a perforation extending longitudinally through said journals 3. And with the wing 4 secured on one of the legs of said angle bar 3′.

On the near and the projecting end of the journal 3 is secured a crank arm 5, carrying a roller 6 on its upward prong, with said roller 6 projecting outward in position to engage with a lever later on noted; and having its projecting end 7 bifurcated and slotted at 7′, for the purpose later on noted. 8 is a prong projecting forward from the heel of said crank arm 5. 10 is a crank arm secured on the opposite end of the shaft 3, provided with a corresponding roller 6.

11 represents advance levers, and 11′ indicates their fulcrums, pivoted to the press back of the rollers 6, 6, and with their free ends curved to a radius of the path of the rollers 6, and their rear and projecting ends pivotally connected by links 12, 12, pivoted in brackets 13, 13, rigid on the side wings 14, 14, said side wings 14, 14, are pivoted to the press by common hinges 15, 15.

16, 16, are spurs on the levers 11, located above the rollers 6 6. The rear wing of the hopper is preferably curved to a radius of its distance from the pivot of the controlling wing, and pivoted to the side of the press in any well known manner at the far end of the feed opening.

18 is a spring secured with one end to the wing 17 and with its opposite end to the press, in a manner to draw said wing 17 out a desirable distance. Said wing 17 is drawn in by the arms 19, 19, rigid on the side wings 14, 14, which are formed to a proper curve and of ample length to engage with said end wing 17.

The controlling wing 4 is preferably formed of a plate with the edges turned up to give rigidness, and with its free end bent inward to partly tuck down the hay between the beats. Said plate is secured with one end on the angle bar 3′.

20 is a bar secured with one end to near the center of the wing 4 and projecting with its free end forward and outward, towards one side of the press and beyond the shaft or pivot 3, 3, and braced out from said shaft a short distance by a brace 21 reinforced by a brace 22 extending from the prong 8 to said brace 21.

23, 23, are the usual bridle bars secured to the plates 1, 1, and extending forward, and connected by a cross bar 24, above the plunger bar 25, to receive the top rod 26.

27 is a shiftable shaft pivoted in the bridle bars 23, 23, a short distance back of the cross bar 24. 28 is a bellcrank lever rigid on said shaft 27, and connected with its prong 28′ by a link 29 to the projecting end of the bar 20, and extending with its opposite arm downward and forward, and to be pressed by a spring 31 on the shaft 27, in to engagement with the serrations 32 on the plunger bar 25 located a proper distance from the plunger.

33, 33 are stay rods, connecting the cross bar 24 to the corner bars 1″.

34 represents an advance arm or tongue, pivoted on the controlling wing 4, and projecting with its body through a slot 35 formed in the wing 4, and resting with its body against the inner side of said wing 4 when locked in place. 36 is a short and inwardly projecting bulge or curve on said tongue a short distance from its heel, for the purpose later on noted. The pivot of said tongue 34 extends through the hollow journal 3, and having its projecting end bent at right angles, (see Figs. 1, 2, and 11,) to form a crank 37, with its end turned inward, and having pivoted thereon a bar 38 of proper length, and with a head 39 on the opposite end of said bar and in position to engage with the bridle or prongs 7, and with the bosses 40, 40, on said head to engage the slots 7′. The head 39 supports a rod 42 shiftable therein. 43 is a helical spring on said rod 42, resting with one end against the head 39 and with its opposite end against a nut near the end of said rod 42. 44 is a collar adjustable on said rod 42 on the opposite side of the head 39.

45 represents a dog or lever centrally pivoted on the spur 8, and projecting with one end forward to engage, when in normal position, with the crank 37; and with its opposite end extending downward to be engaged by the collar 44, and shifted back and retained in position by a spring 46 secured on the brace 22 and extending with its free end to engage said dog 45.

47 is a dog, pivoted on the bar 1″, its body projecting upward to be engaged by the head 39, and having its upper end curved rearward; and with said end 48 of ample area not to engage the slots 7′. Said dog 47 is pressed upward by a spring 49 coiled on the pivot of said dog and resting with one end against the body of said dog, and with its other end on the edge of the bar 1″. The upward movement of said dog 47 is limited by a lug 50.

51, 51, are latches, located near the free end of the wing 4, and projecting with their free ends through the flanges of said wing 4, in position to engage with the perforations 52 formed at a proper height in the plates 1, 1; and with their inner ends pivoted to the ends of a centrally pivoted lever 53.

54 is a centrally pivoted lever, located at the heel on the wing 4, and projecting with its free end through a slot formed in the angle bar or shaft 3′, and connected with its opposite end by a rod to an arm 56 formed on the lever 53. Said latches 51, 51, are pressed outward by a spring 57 resting with one end on the boss 58, and with its opposite end on a boss 59, rigid on the end of the lever 53.

60 represents the usual plunger secured to the plunger bar 25 by a bolt 61; 62 is a brace extending from the bolt 61 to the top plate 63 to retain said plate in position. The front end of said plate 63 is pressed upward by a spring 64 resting against said plate and on a stud 65, rigid on the plunger 60.

66 is a lug rigid on the underside of the plate 63, and having pivoted thereto a dog 67 projecting with its head 67′ forward and through a slot formed in the plate 63, and pressed in such position by a spring 69, resting with one end against the plate 63 and with its other end on a heel 70 of said dog 67.

In operating the press: hay or other fibrous material is deposited on the hopper when open, as seen in Figs. 1 and 2. And as the plunger nears the end of its outward movement the rod 42 is drawn forward, (by mechanism on the front or power end of the press, not shown,) and compressing the spring 43, and as said spring 43 is about compressed, the collar 44 moves against the heel of the dog 45 and disengaging the opposite end of said dog 45 from the crank 37, and the continuous forward movement of the rod 42 and the compressed spring 43 will cause the bosses 40 40 to shift inward in the slots 7′ and shift the tongue 34 and its mechanism to the position as seen in dotted lines in Fig. 2, thus closing the tongue 34 down on the loose hay on the hopper. The dog 47 will move inward until its free end rests against the prongs 7, after the heel of the head 39 will disengage the said dog 47 and allow the crank arms 5 and 10 and their mechanism to shift forward, and the rollers 6, 6, being in contact with the advance levers 11 will shift said levers to the position seen in Fig. 4, thus closing the side wings 14 14 of the hopper: As said side wings are closed the arms 19 19 engage the end wing 17 and draw it in. At the time the hopper is closed the rollers 6, 6 have arrived at the curved portion of the levers 11 and play therein and thus retain the hopper in a closed position. The wing 4 will have moved by this time to the position as seen in dotted lines in Fig. 4. And the rollers 6, 6, having no further resistance will allow the spring 43 to expand again, and the continuous forward movement of the rod 42 will now rapidly close said controlling wing 4 down to the level of the upper edge of the plunger, and shift the material in the hopper to the compression chamber, and the latches 51, 51 engaging the perforations 52 will lock said wing 4 and its connecting mechanism in the position seen in full lines in Fig. 5. But if there is a heavy resistance in the hopper such as an excessive charge of hay in the hopper; the spring 43 is again compressed and thus allow the closing of wing 4 to discontinue to a certain degree, in which instance the plunger bar 25 will now move inward faster than the movement of the free end of the arm 28, and thus cause the serrations 32 to engage with the free end of said arm 28 and closing said wing 4 down by direct force, or stop the team by reason of stopping the plunger bar 25. By the time the wing 4 is closed down, the power mechanism will release the rod 42. As the plunger 60 now moves inward, the front edge of the top plate 63 engages the curve 36 and raises the tongue 34 against the wing 4; provided said tongue has not already been raised to said position by the partly compressed material, and again allow the dog 45 to engage the crank 37, and lock said tongue 34 in position. The plunger 60 continuing on its inward movement, it will move the dog 67 against the free end of the lever 54 shifting said end in such direction and thus drawing in the latches 51, 51 by the rod 55 and the lever 53. And the free end of the lever 54 having been pressed in or against the angle bar 3′ (see Figs. 3 and 5,) and the line of the pivot of the dog 67 and said lever 54 is below the pivot 3, and thus the onward movement of the dog 67 will open out the wing 4; the angle bar 3′ will now engage the projecting nose on said dog 67 and disengage said dog, and allow the plunger to move on. As the crank arms 5 and 10 swing back, the rollers 6, 6 thereon move against the spurs 16, 16 and open the side wings 14, 14, and the wing 17 being drawn back by the springs 18. As the crank arm 5 with its mechanism is moved back to the position seen in Fig. 2, the heel of the dog 47 will engage the heel of the head 39 and lock said crank arm in position, with hopper open as seen in Figs. 1 and 2, until again closed as above described.

The front and lower corner of the wings 14, 14 are cut away to clear the movement of the brace 22.

It will be understood that, instead of the angle bar shaft 3′, material of any other form may be employed. And various other changes can be made without departing from the spirit of my invention.

Having thus described my invention, what I claim as new and desire to secure by Letters Patent, is,—

1. A hay-press having a hopper provided with lateral condensing wings pivoted thereto and a wing controlling said condensing wings and operating to shift the hay into said press after the hay has been condensed by said lateral wings.

2. In a self-feeding hay-press, a hopper formed of lateral wings pivoted to said press and a controlling wing pivoted to said press and coöperating with said lateral wings and provided with means for actuating said lateral wings.

3. In a self-feeding hay-press, the combination of a hopper formed of wings hinged to the press, a controlling wing forming a part of said hopper arranged to control or operate the side wings, an advance arm or tongue carried by said controlling wing, and means to operate said tongue.

4. In a self-feeding hay-press, the combination of a hopper formed of wings hinged to the press, a controlling wing for said hopper arranged to control or operate the side wings, a shaft or pivots for said controlling wing, crank-arms on said pivots, an advance arm or tongue carried by said controlling wing having a projecting end with a crank formed thereon, a dog carried by one of said crank arms to engage with said crank.

5. In a self-feeding hay-press, the combination of a hopper formed of wings hinged to the press, a controlling wing for said hopper arranged to control or operate the side wings, a shaft or pivots for said controlling wing, crank-arms on said pivots, an advance arm or tongue having a curve and carried by said controlling wing, a crank formed on the projecting heel of said tongue, a dog carried by one of said crank arms to engage with the crank of said tongue, a plunger in the compression chamber to engage with the curve of said tongue, and means to operate said plunger.

6. In a self-feeding hay-press, the combination of a hopper formed of wings hinged to the press, a controlling wing for said hopper arranged to control or operate the side wings, a shaft or pivots for said controlling wing, crank-arms on said pivots, prongs on one of said crank-arms, an advance arm or tongue carried by said controlling wing having a projecting end or heel with a crank formed thereon, a bar having a head supported by said prongs and pivoted on the crank of said tongue, and a dog pivoted on the press to engage with said head.

7. In a self-feeding hay-press, the combination of a hopper formed of wings hinged to the press, a controlling wing for said hopper arranged to control the side wings, a shaft or pivots for said controlling wing, crank-arms on said pivots, prongs on one of said crank-arms, an advance arm or tongue carried by said controlling wing having a projecting end or heel with a crank formed thereon, a bar having a head thereon and supported by said prongs and pivoted on the crank of said tongue, a rod supported adjustably by said head, a collar on said rod, a dog pivoted on one of said crank arms and engaged by said collar, and means to operate said rod.

8. In a self-feeding hay-press, the combination of a hopper formed of wings hinged to the press, a controlling wing for said hopper pivoted to the press, a shaft or pivots for said controlling wing, crank-arms on said pivots, studs or rollers on said crank arms, levers pivoted to the press and connected to the side wings of said hopper, and with their free ends in contact with said rollers, and means to operate said crank-arms.

9. In a self-feeding hay-press, the combination of a hopper formed of wings hinged to the press, a controlling wing for said hopper pivoted to the press, a shaft or pivots for said controlling wing, crank-arms on said pivots, studs or rollers on said crank-arms, levers pivoted to the press and connected to the side wings of said hopper, and spurs on said levers in contact with said rollers.

10. In a self-feeding hay-press, the combination of a hopper formed of wings pivoted to the press, pivots or a shaft pivoted on the press, a wing thereon, crank-arms on said pivots, levers having their free ends curved and pivoted to the press, rollers on the crank-arms in contact with said levers, and means to operate said crank-arms.

11. In a self-feeding hay-press, the combination of a hopper formed of wings hinged to the press, a controlling wing having a shaft, crank-arms on said shaft, a head supported by one of said crank-arms, a rod supported by said head, levers pivoted to the press and connected to the side wings of the hopper and in contact with said rollers, and means to operate said crank-arms.

12. In a self-feeding hay-press, the combination of a hopper formed of wings hinged to the press, a controlling wing having a shaft, crank-arms on said shaft, a head supported by one of said crank-arms, a rod supported adjustably by said head, a spring on said rod, a bell crank lever pivoted to the press and connected to the controlling wing, a plunger bar having serrations thereon to engage with said bell crank lever, and means to operate said plunger.

13. In a self-feeding hay-press, the combination of a hopper formed of wings hinged to the press, a controlling wing for said hopper arranged to operate the side wings, side plates for the press having perforations, latches pivoted on said controlling wing to engage with said perforations, a projecting lever pivoted on said controlling wing and connected to said latches, a plunger, a dog on said plunger to engage with said lever, and means to operate said plunger.

14. In a self-feeding hay-press provided with a compression chamber and a plunger adapted to operate therein; a hopper formed of an end and lateral condensing wings hinged to the press, a controlling wing carrying means to open the hopper, and means carried by said plunger to actuate said opening means.

15. In a self-feeding hay-press, the combination of a hopper formed of wings hinged to the press, a shaft pivoted on the press, a controlling wing secured thereon, crank-arms on said shaft, levers pivoted to the press and connected to the side wings, arms on said wings, an end wing pivoted to the press, and means to operate said crank arms.

16. A hay-press having a hopper formed of lateral wings and a controlling wing pivoted to the press and means to close the lateral wings of said hopper during the first partial movement of the said controlling wing.

In testimony whereof I have set my hand hereto in the presence of two witnesses, this 1st day of February, 1908.

GEORGE SCHUBERT.

Witnesses:
A. L. JACKSON,
J. W. STITT.